United States Patent [19]

Langhauser et al.

[11] Patent Number: 5,491,205
[45] Date of Patent: Feb. 13, 1996

[54] PREPARATION OF POLYMERS OF $C_2$-$C_{10}$-ALK-1-ENES USING RACEMIC METAL-LOCENE COMPLEXES AS CATALYSTS

[75] Inventors: Franz Langhauser, Bad Dürheim; Jürgen Kerth, Carlsberg; Günther Schweier, Friedelsheim; Hans-Herbert Brintzinger, Taegerswilen; Stefan Mansel; Werner Roell, both of Constance; Robin Kirsten, Bodman-Ludwigshafen, all of Germany

[73] Assignee: BASF Aktiengesellschaft, Ludwigshafen, Germany

[21] Appl. No.: 330,870

[22] Filed: Oct. 28, 1994

[30] Foreign Application Priority Data

Oct. 30, 1993 [DE] Germany .................. 43 37 233.3

[51] Int. Cl.[6] .................. C08F 4/622; C08F 10/00
[52] U.S. Cl. .................. 526/121; 526/122; 526/127; 526/160; 526/134; 502/103; 502/117; 556/11; 556/53
[58] Field of Search .................. 526/121, 122, 526/127, 160

[56] References Cited

U.S. PATENT DOCUMENTS 5,359,102 10/1994 Inoue et al. .................. 526/113
5,372,980 12/1994 Davis .................. 526/160

FOREIGN PATENT DOCUMENTS 344887 12/1989 European Pat. Off. .
93/20113 4/1992 WIPO .

OTHER PUBLICATIONS

Grossman et al., *J. Am. Chem. Soc.*, vol. 113, 1991, pp. 2321–2322.

Wild et al., *J. of Org. Chem.* vol. 232, 1982, pp. 233–247.

Wiesenfeldt et al., *J. of Org. Chem.* vol. 369, 1989, pp. 359–370.

Primary Examiner—Edward J. Smith
Attorney, Agent, or Firm—Keil & Weinkauf

[57] ABSTRACT

Polymers of $C_2$-$C_{10}$-alk-1-enes are prepared at from 0.5 to 3000 bar and from −50° to 300° C. using a catalyst system by a process in which the catalyst system used is one which contains, as active components:

a) a metallocene complex of the general formula I

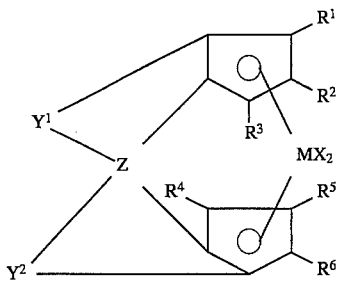

where

M is titanium, zirconium, hafnium, vanadium, niobium or tantalum,

X is fluorine, chlorine, bromine, iodine, hydrogen, $C_1$-$C_{10}$-alkyl, $C_6$-$C_{15}$-aryl or —$OR^7$, $R^7$ is $C_1$-$C_{10}$-alkyl, $C_6$-$C_{15}$-aryl, alkylaryl, arylalkyl, fluoroalkyl or fluoraryl, where each alkyl radical is of 1 to 10 carbon atoms and each aryl radical is of 6 to 20 carbon atoms, $R^1$ to $R^6$ are each hydrogen, $C_1$-$C_{10}$-alkyl, 5-membered to 7-membered cycloalkyl, which in turn may carry $C_1$-$C_{10}$-alkyl radicals as substituents, $C_6$-$C_{15}$-aryl or arylalkyl, where two adjacent radicals together may furthermore be a cyclic group of 4 to 15, carbon atoms, or $Si(R^8)_3$ $R^8$ is $C_1$-$C_{10}$-alkyl, $C_6$-$C_{15}$-aryl or $C_3$-$C_{10}$-cycloalkyl, is silicon, germanium, tin or carbon, $Y^1$, $Y^2$ are each

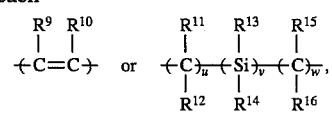

$R^9$ to $R^{16}$ are each hydrogen, $C_1$-$C_{10}$-alkyl, 5-membered to 7-membered cycloalkyl, which in turn may carry $C_1$-$C_{10}$-alkyl radicals as substituents, $C_6$-$C_{15}$-aryl or arylalkyl, where two adjacent radicals together may furthermore be a cyclic group of 4 to 15 carbon atoms, or $Si(R^{17})_3$, $R^{17}$ is $C_1$-$C_{10}$-alkyl, $C_6$-$C_{15}$-aryl or $C_3$-$C_{10}$-cycloalkyl and u, v, w are each an integer from 0 to 7, with the proviso that the sum is u+v+w≥2, and b) an open-chain or cyclic alumoxane compound of the general formula VI or VII

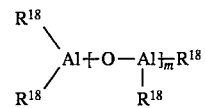

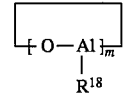

where $R^{18}$ is $C_1$-$C_4$-alkyl and m is an integer from 5 to 30.

1 Claim, No Drawings

PREPARATION OF POLYMERS OF $C_2$-$C_{10}$-ALK-1-ENES USING RACEMIC METAL-LOCENE COMPLEXES AS CATALYSTS

The present invention relates to processes for the preparation of polymers of $C_2$-$C_{10}$-alk-1-enes at from 0.5 to 3000 bar and from $-50°$ to $300°$ C. using a catalyst system. The present invention furthermore relates to the use of the polymers of $C_2$-$C_{10}$-alk-1-enes, prepared by the novel process, for the production of fibers, films and moldings, and the fibers, films and moldings obtainable thereby.

For the stereoselective polymerization of prochiral olefins using metallocene catalysts, it is necessary to employ chiral, stereo-rigid, i.e. bridged, metallocene complexes. In the preparation of isospecific, bridged metallocene complexes, mixtures of the racemic and meso forms are obtained, as described in H. Wiesenfeldt, A. Reinmuth, E. Barsties, K. Evertz and H.-H. Brintzinger, J. Organomet. Chem. 369 (1989), 359–370. Particularly in the polymerization of propylene, only the racemic forms are effective catalysts for the polymerization, whereas the meso forms have comparatively little activity and give low molecular weight, atactic material, necessitating separation of the racemic and meso forms. This separation can be carried out by fractional crystallization or extraction, as described in EP-A 344 887, or by chromatographic working-up, described in F.R.W.P. Wild, L. Zsolnai, G. Huttner and H.-H. Brintzinger, J. Organomet. Chem. 232 (1982), 233–247 and R. B. Grossman, W. M. Davis and S. L. Buchwald, J. Am. Chem. Soc. 113 (1991), 2321–2322. However, the separation of the individual isomers entails considerable expense and is therefore not practicable for industrial applications.

It is an object of the present invention to provide processes for the preparation of polymers of $C_2$-$C_{10}$-alk-1-enes using metallocene catalysts, which do not involve complicated process engineering and dispense with the working-up steps in the preparation of the catalysts.

We have found that this object is achieved, according to the invention, if the catalyst system used is one which contains, as active components, a) a metallocene complex of the general formula I

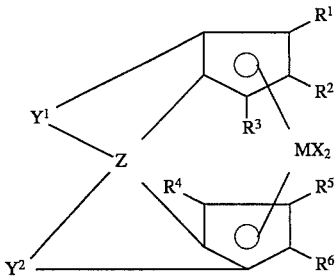

where

M is titanium, zirconium, hafnium, vanadium, niobium or tantalum,

X is fluorine, chlorine, bromine, iodine, hydrogen, $C_1$-$C_{10}$-alkyl, $C_6$-$C_{15}$-aryl or $-OR^7$, $R^7$ is $C_1$-$C_{10}$-alkyl, $C_6$-$C_{15}$-aryl, alkylaryl, arylalkyl, fluoroalkyl or fluoraryl, where each alkyl radical is of 1 to 10 carbon atoms and each aryl radical is of 6 to 20 carbon atoms, $R^1$ to $R^6$ are each hydrogen, $C_1$-$C_{10}$-alkyl, 5-membered to 7-membered cycloalkyl, which in turn may carry $C_1$-$C_{10}$-alkyl radicals as substituents, $C_6$-$C_{15}$-aryl or arylalkyl, where two adjacent radicals together may furthermore be a cyclic group of 4 to 15, preferably 8 to 15, carbon atoms, or $Si(R^8)_3$ $R^8$ is $C_1$-$C_{10}$-alkyl, $C_6$-$C_{15}$-aryl or $C_3$-$C_{10}$-cycloalkyl, Z is silicon, germanium, tin or carbon, $Y^1$, $Y^2$ are each

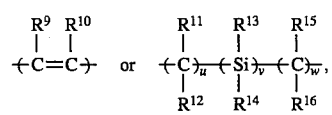

$R^9$ to $R^{16}$ are each hydrogen, $C_1$-$C_{10}$-alkyl, 5-membered to 7-membered cycloalkyl, which in turn may carry $C_1$-$C_{10}$-alkyl radicals as substituents, $C_6$-$C_{15}$-aryl or arylalkyl, where two adjacent radicals together may furthermore be a cyclic group of 4 to 15 carbon atoms, or $Si(R^{17})_3$, $R^{17}$ is $C_1$-$C_{10}$-alkyl, $C_6$-$C_{15}$-aryl or $C_3$-$C_{10}$-cycloalkyl and u, v, w are each an integer from 0 to 7, with the proviso that the sum is $u+v+w \geq 2$, and b) an open-chain or cyclic alumoxane compound of the general formula VI or VII

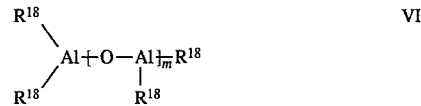

where $R^{18}$ is $C_1$-$C_4$-alkyl and m is an integer from 5 to 30.

We have also found the use of the resulting polymers of $C_2$-$C_{10}$-alk-1-enes for the production of fibers, films and moldings, and the fibers, films and moldings obtainable thereby.

Preferred metallocene complexes of the general formula I are those in which

M is zirconium or hafnium

X is chlorine or $C_1$-$C_4$-alkyl $R^1$ to $R^6$ are each hydrogen, $C_1$-$C_{10}$-alkyl or phenyl Z is silicon or carbon, $Y^1$, $Y^2$ are each

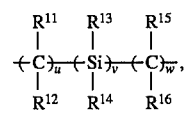

and $R^{11}$ to $R^{16}$ are each hydrogen or $C_1$-$C_4$-alkyl.

Particularly preferred metallocene complexes I are those in which the two substituted cyclopentadienyl systems are identical and $Y^1$ and $Y^2$ are identical, i.e. symmetrical compounds. Particularly preferred substituents $Y^1$ and $Y^2$ are

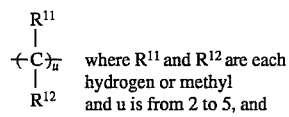

where $R^{11}$ and $R^{12}$ are each hydrogen or methyl and u is from 2 to 5, and

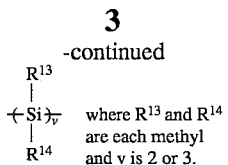
where $R^{13}$ and $R^{14}$ are each methyl and v is 2 or 3.

The following are particularly preferred:
bis(spirosilacyclohexane-[b]-tert-butylcyclopentadienyl)zirconium dichloride,
bis(spirosilacyclohexane-[b]-methylcyclopentadienyl)zirconium dichloride,
bis(spirosilacyclohexane-[b]-phenylcyclopentadienyl)zirconium dichloride,
bis(spirosilacyclohexane-[b]-tert-butylcylopentadienyl)hafnium dichloride,
bis(spirosilacyclohexane-[b]-methylcyclopentadienyl)hafnium dichloride,
bis(spirosilacyclohexane-[b]-phenylcyclopentadienyl)hafnium dichloride,
bis(spirosilacyclohexane-[b]-tert-butylcyclopentadienyl)zirconiumdimethyl,
bis(spirosilacyclohexane-[b]-methylcyclopentadienyl)zirconiumdimethyl and
bis(spirosilacyclohexane-[b]-phenylcyclopentadienyl)zirconiumdimethyl.

A preferred process for the preparation of the metallocene complexes I is the following:

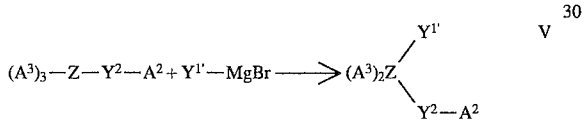

where $A^3$ is fluorine, chlorine, bromine or iodine, preferably chlorine, $A^2$ is fluorine, chlorine, bromine, iodine or $-R^{19}OSO_3$, preferably chlorine or bromine, $R^{19}$ is $C_1$-$C_{10}$-alkyl, $C_6$-$C_{15}$-aryl or $C_3$-$C_{10}$-cycloalkyl and $Y^{1'}$ is $Y^1$ with a terminal double bond.

This reaction is known in principle and is described, for example, in R. E. Scott and K. C. Frisch, J. Am. Chem. Soc. 73 (1951) 2599–2600.

The reaction

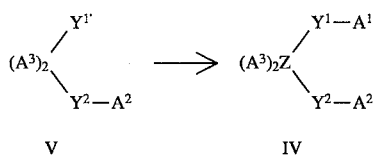

where $A^1$ is fluorine, chlorine, bromine, iodine or $-R^{19}OSO_3$, preferably chlorine or bromine, and $R^{19}$ is $C_1$-$C_{10}$-alkyl, $C_6$-$C_{15}$-aryl or $C_3$-$C_{10}$-cycloalkyl, is preferably carried out by an addition reaction with H-$A^1$, in particular with H-Br, as described in principle in Houben-Weyl, Volume IV/5a, pages 454–456, or J. E. Francis and L. C. Leitch, Canad. J. Chem. 35 (1957), 500–503.

The reaction of IV with

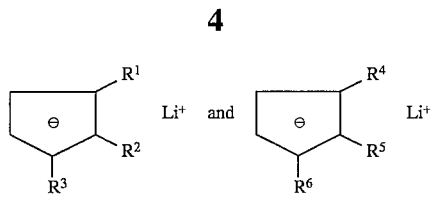

gives cyclopentadienyl compounds of the general formula III

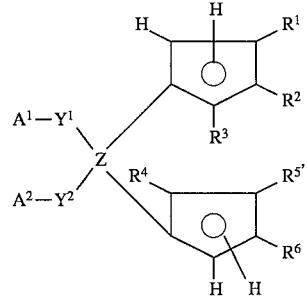

which can be reacted with metalating agents, such as alkali metal alkyls, alkaline earth metal alkyls, alkali metal hydrides or alkaline earth metal hydrides, preferably n-butyllithium, to give cyclopentadienyl compounds of the general formula II

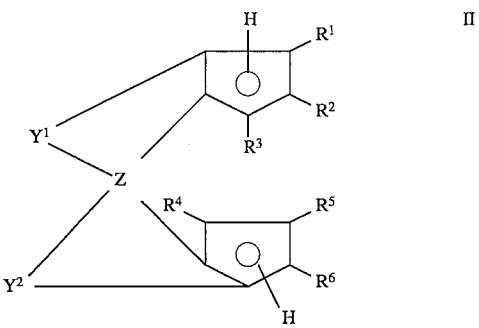

The cyclopentadienyl compounds II can be converted into the metallocene complexes I by reaction with metalating agents, such as alkali metal alkyls, alkaline earth metal alkyls, alkali metal hydrides or alkaline earth metal hydrides, preferably n-butyllithium, and subsequent addition of $MX_4$.

The reaction conditions for the preparation of the cyclopentadienyl compounds III are not critical per se. Usually, organic solvents, such as hydrocarbons and/or ethers, preferably a mixture of tetrahydrofuran (THF) and pentane, are added to IV and the mixture is cooled to temperatures of from −80° to 0° C. The corresponding cyclopentadienyl-lithium compounds, to which a solvent, such as THF, has preferably been added, are then introduced. After the mixture has warmed up to room temperature, working up is carried out by adding an aqueous ammonium salt solution, preferably a saturated ammonium chloride solution, and the phases are separated.

The reaction conditions for the preparation of cyclopentadienyl compounds II and of metallocene complexes I are also not critical; the procedure is preferably similar to the method described for the preparation of the cyclopentadienyl compounds III.

This gives the metallocene complexes I which are suitable for the polymerization of $C_2$-$C_{10}$-alk-1-enes and which are present in their racemic forms Ia and Ib

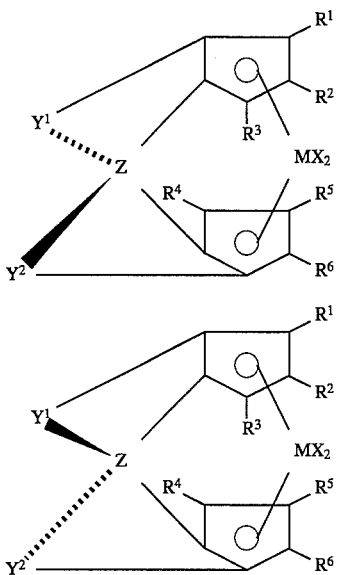

and not meso forms.

The metallocene complexes may be used in cationic form, as described in EP-A 277 003 and EP-A 277 004.

In addition to the metallocene complexes I, the catalyst systems used also contain oligomeric aluminum oxide compounds. For example, open-chain or cyclic alumoxane compounds of the general formula VI or VII

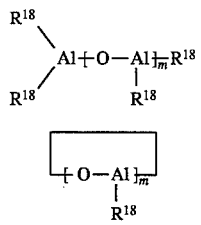

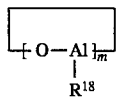

where $R^{18}$ is $C_1$-$C_4$-alkyl, preferably methyl or ethyl, and m is an integer from 5 to 30, preferably from 10 to 25, are suitable.

VII

The preparation of these oligomeric alumoxane compounds is usually carried out by reacting a solution of trialkylaluminum with water as described in, inter alia, EP-A 284 708 and U.S. Pat. No. 4,794,096.

As a rule, the resulting oligomeric alumoxane compounds are obtained as mixtures of both linear and cyclic chain molecules of different lengths, so that m is to be regarded as an average value. The alumoxane compounds may also be in the form of a mixture with other metal alkyls, preferably with alkylaluminums.

It has proven advantageous to use the complex of metals of subgroups IV and V of the Periodic Table and the oligomeric alumoxane compound in amounts such that the atomic ratio of aluminum from oligomeric alumoxane compound to the transition metal from the complex of metals of subgroups IV and V of the periodic table is from 10:1 to $10^6$:1, in particular from 10:1 to $10^4$:1.

Conventional aromatic hydrocarbons, preferably of 6 to 20 carbon atoms, in particular xylenes and toluene, and mixtures thereof are used as solvents for these catalyst systems.

A supported catalyst system may also be used in the preparation of the polymers of $C_2$-$C_{10}$-alk-1-enes. Examples of suitable carriers are silica gels, preferably those of the formula $SiO_2 \cdot a\, Al_2O_3$, where a is from 0 to 2, preferably 0 to 0.5; these are therefore aluminosilicates or silica. The carriers preferably have a particle diameter of from 1 to 200 μm, in particular from 30 to 80 μm. Such products are commercially available, for example Silica Gel 332 from Grace.

Polymers of $C_2$-$C_{10}$-alk-1-enes are to be understood as homo- or copolymers of $C_2$-$C_{10}$-alk-1-enes, in particular of $C_2$-$C_6$-alk-1-enes. Homopolymers of ethylene or of propylene and copolymers of ethylene and propylene, ethylene and but-1-ene, ethylene and pent-1-ene, ethylene and hex-1-ene, and propylene and but-1-ene, propylene and pent-1-ene and propylene and hex-1-ene, are preferred. The amount of comonomers may be up to 50, in particular up to 30, % by weight.

The novel process may be carried out in solution, in suspension, in the gas phase or as a mass polymerization. The process for the preparation of the polymers of $C_2$-$C_{10}$-alk-1-enes is preferably carried out in the gas phase. The polymerization conditions are not critical per se; pressures of from 0.5 to 3000, preferably from 1 to 80, bar and temperatures of from –50° to +300° C., preferably from 0° to 150° C., have proven suitable. The polymerization may be carried out in the presence of conventional regulators, for example hydrogen or $C_2$-$C_8$-alk-1-enes, and in conventional polymerization reactors.

In a preferred process for the preparation of homopolymers of $C_2$-$C_{10}$-alk-1-enes, the active components of the catalyst system are initially taken in toluene at from 0° to 140° C.

For this purpose, the $C_2$-$C_{10}$-alk-1-ene is then introduced at from 1 to 60 bar over a period of from 0.5 to 12 hours. The polymers are then worked up by a conventional method.

The novel process for the preparation of polymers of $C_2$-$C_{10}$-alk-1-enes involves simple process engineering.

The polymers of $C_2$-$C_{10}$-alk-1-enes, prepared by the novel process, have a balanced property profile and are particularly suitable for the production of fibers, films and moldings. The polymers of $C_3$-$C_{10}$-alk-1-enes, prepared by the novel process, have a 1,3 insertion error rate (WO 92/5204) of from 0.1 to 100, preferably from 1 to 50, in particular from 2 to 30, per 1000 monomer units, where, in the case of copolymers, monomers are to be understood as meaning the total amount of monomers.

EXAMPLES

Example 1: Preparation of homopolypropylene 3.2 mg ($\hat{=}$ 6.25 μmol) of bis(spirosilacyclohexane-[b]-tert-butylcyclopentadienyl)zirconium dichloride were added to a solution of 0.44 g (= 7.6 mmol) of methylalumoxane in toluene (1.53 molar, from Witco) at 50° C., and stirring was carried out for 30 minutes. Thereafter, propylene was introduced at 2 bar over a period of 4 hours, this mixture was then poured into a mixture of 700 ml of methanol and 30 ml of concentrated HCl and the precipitate was filtered off and washed with 50 ml of methanol. Drying over a period of 6 hours at 10 mbar at 80° C. gave 48.7 g of homopolypropylene having a melting point of 128.8° C., a weight average molecular weight $\bar{M}_w$ of 9800, a number average molecular weight $\bar{M}_n$ of 5600, so that $\bar{M}_w/\bar{M}_n = 1.75$, and an intrinsic viscosity η of 0.16 dl/g.

The melting point was determined by means of a DSC measurement (10° C./1 min heating rate). The weight average molecular weight $M_w$ and the number average molecular weight $M_n$ were determined by gel permeation chromatography. The intrinsic viscosity η was determined using a 0.1% strength by weight solution in decalin at 135° C.

The productivity of the catalyst system was 974 g/mol Zr·bar·h.

The pentads were determined by NMR analysis:

| mm | 97.8 | mr | 1.8 | rr | 0.4 |
|---|---|---|---|---|---|
| mmmm | 88.2 | mmmr | 0.3 | rmrr | 0.1 |
| mmmr | 9.1 | rmrr + mmrm | 1.3 | mrrr | 0.3 |
| rmmr | 0.5 | rmrm | 0.2 | mrrm | 0.0 |

We claim:
1. A process for the preparation of polymers of $C_2$-$C_{10}$-alk-1-enes at from 0.5 to 3000 bar and from −50° to 300° C. using a catalyst system, wherein the catalyst system used is one which contains, as active components, a) a metallocene complex of the formula I

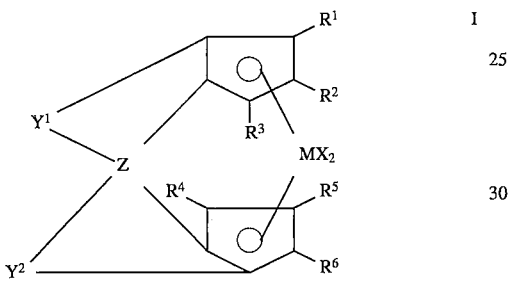

where
M is titanium, zirconium, hafnium, vanadium, niobium or tantalum,
X is fluorine, chlorine, bromine, iodine, hydrogen, $C_1$-$C_{10}$-alkyl, $C_6$-$C_{15}$-aryl or —$OR^7$,
$R^7$ is $C_1$-$C_{10}$-alkyl, $C_6$-$C_{15}$-aryl, alkylaryl, arylalkyl, fluoroalkyl or fluoraryl, where each alkyl radical is of 1 to 10 carbon atoms and each aryl radical is of 6 to 20 carbon atoms,
$R^1$ to $R^6$ are each hydrogen, $C_1$-$C_{10}$-alkyl, 5-membered to 7-membered cycloalkyl, which in turn may carry $C_1$-$C_{10}$-alkyl radicals as substituents, $C_6$-$C_{15}$-aryl or arylalkyl, where two adjacent radicals together may furthermore be a cyclic group of 4 to 15 carbon atoms, or $Si(R^8)_3$
$R^8$ is $C_1$-$C_{10}$-alkyl, $C_6$-$C_{15}$-aryl or $C_3$-$C_{10}$-cycloalkyl,
Z is silicon, germanium, tin or carbon,
$Y^1$, $Y^2$ are each

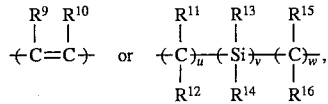

$R^9$ to $R^{16}$ are each hydrogen, $C_1$-$C_{10}$-alkyl, 5-membered to 7-membered cycloalkyl, which in turn may carry $C_1$-$C_{10}$-alkyl radicals as substituents, $C_6$-$C_{15}$-aryl or arylalkyl, where two adjacent radicals together may furthermore be a cyclic group of 4 to 15 carbon atoms, or $Si(R^{17})_3$,
$R^{17}$ is $C_1$-$C_{10}$-alkyl, $C_6$-$C_{15}$-aryl or $C_3$-$C_{10}$-cycloalkyl and
u, v, w are each an integer from 0 to 7, with the proviso that the sum is u+v+w≧2, and b) an open-chain or cyclic alumoxane compound of the formula VI or VII

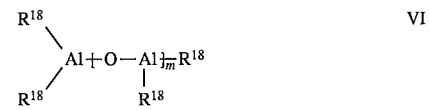

where
$R^{18}$ is $C_1$-$C_4$-alkyl and m is an integer from 5 to 30.

* * * * *